Sept. 1, 1925.
D. HINDAHL
1,551,741
SHAFT OPERATING MEANS
Filed Nov. 1, 1923
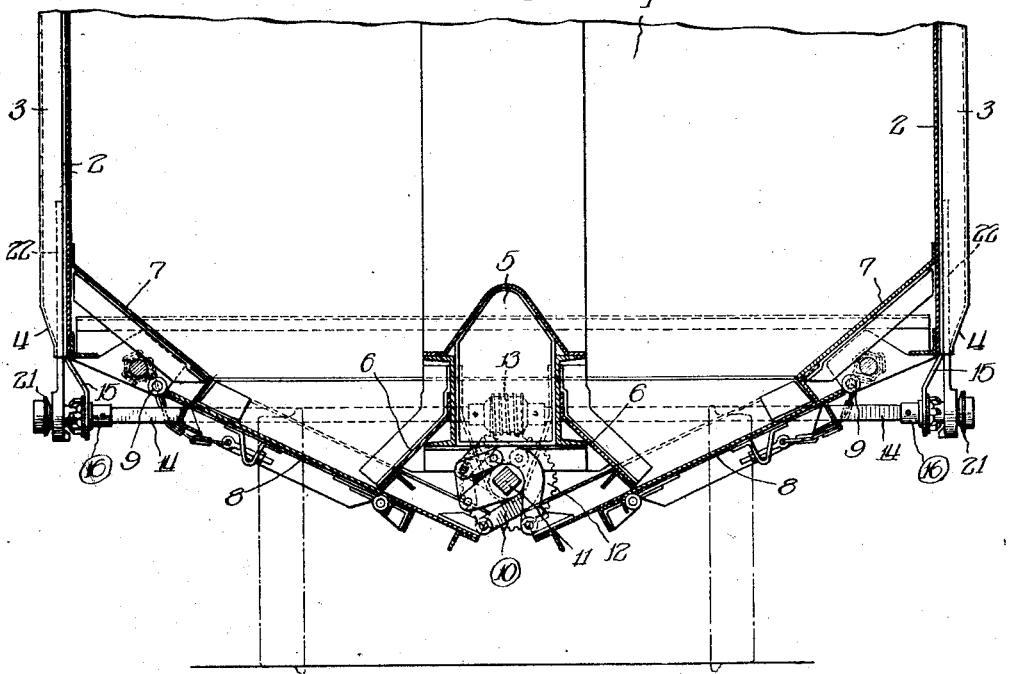
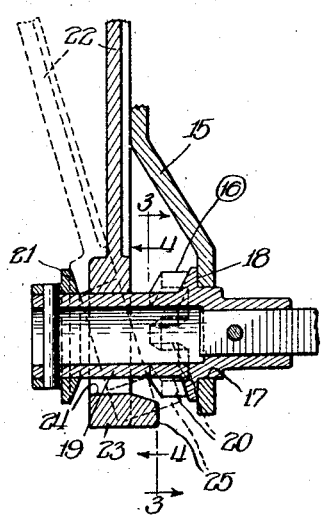
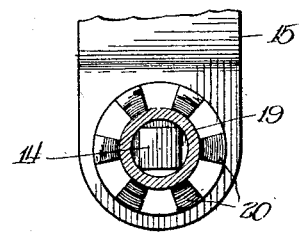
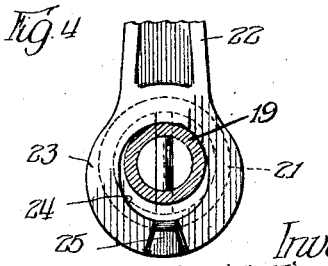
Inventor:
David Hindahl,
Witness:
R. Burkhardt.

Patented Sept. 1, 1925.

1,551,741

UNITED STATES PATENT OFFICE.

DAVID HINDAHL, OF CHICAGO, ILLINOIS, ASSIGNOR TO RODGER BALLAST CAR COMPANY, OF CHICAGO, ILLINOIS, A CORPORATION OF MAINE.

SHAFT-OPERATING MEANS.

Application filed November 1, 1923. Serial No. 672,078.

*To all whom it may concern:*

Be it known that I, DAVID HINDAHL, a citizen of the United States, residing at Chicago, in the county of Cook and State of Illinois, have invented certain new and useful Improvements in Shaft-Operating Means, of which the following is a specification.

The present invention relates to shaft operating means.

The invention has been illustrated and will be described in connection with dump car construction. The present invention adapts itself particularly for use with the operating shaft for the dump doors of ballast or other dump cars, though as the description proceeds it will be apparent that the invention has a broader application. The dump car construction chosen for illustration has a transversely extending shaft, the length of which is necessarily limited in accordance with the over-all transverse dimensions of the car with which it is used.

An object of the present invention is to provide shaft operating mechanism which is readily available for use at all times but which requires a minimum of space.

A further object is to provide dump car construction having a transversely extending shaft together with means for controlling the operation of said shaft, said parts being so constructed and arranged that the means for operating said shaft are always readily and conveniently available, though requiring no more space transversely of the car than is required for the car itself.

A further object is to provide operating mechanism for a shaft, which mechanism is always readily available, is efficient in its operation and non-obtrusive when out of use.

A further object is to provide shaft operating mechanism for a dump car by which the dump gates of said car may be operated with a step by step movement, which operating mechanism will be placed at a convenient angle when in use and which may be placed in ordinarily unused space when not in use.

A further object is to provide shaft operating mechanism which adapts itself to car construction as at present commonly used, whereby to make use of space now not ordinarily used.

Further objects will appear as the description proceeds.

Referring to the drawings—

Figure 1 is a transverse sectional view of a dump car embodying the principles of the present invention;

Figure 2 is a detail view illustrating one embodiment of the present invention;

Figure 3 is a sectional view taken along the plane indicated by the arrows 3—3 of Figure 2; and Figure 4 is a sectional view taken along the plane indicated by the arrows 4—4 of Figure 2.

The numeral 1 indicates a dump car having the side walls 2, 2 reinforced by the stakes 3, 3, which stakes may be beveled at their lower ends, as indicated by numerals 4, 4.

The numeral 5 indicates a center sill cooperating with which are sloping bottom walls 6, 6. Adjacent to the side walls 2, 2 are the inwardly sloping bottom walls 7, 7. The numerals 8, 8 indicate dump doors which are pivoted for swinging movement about the axes 9, 9, said dump doors being controlled by certain link mechanism indicated as a whole by numeral 10. Said link mechanism is well understood by those skilled in the art and need not be explained herein. It will be sufficient to state that said link mechanism is controlled by the shaft 11, which in turn is operated by the gear 12. The gear 12 meshes with the worm 13 which is fast upon the transversely extending shaft 14. Operation of the shaft 14 will result in operation of the link mechanism 10, rotation of said shaft 14 in one direction resulting in an opening movement of the doors 8, 8, and rotation of said shaft in the opposite direction resulting in the closing of said doors 8, 8. Suitable detent means will be provided for permitting a ratcheting of the shaft 14 by mechanism which will now be described.

The ends of the shaft 14 may be journaled in the downwardly extending members 15, 15, which are supported from the frame of the car. Each end of the shaft 14 is provided with a toothed member 16, said members being pinned or otherwise united to said shaft. Each toothed member 16, as best shown in Figure 2, has a portion 17 journaled in the downwardly extending member 15 and has the flat surface 18 bearing against the outer side of said downwardly extending member 15. Each toothed member 16 has the cylindrical portion 19 at one end of which are the teeth 20, 20, and at the other end of which is the collar 21 which may have a conical inwardly presented face, said collar 21 being pinned or otherwise non-rotatably connected to the toothed member 16. Mounted upon the cylindrical portion 19 is the handle 22, which handle 22 is provided with the head portion 23 having the aperture 24 loosely encircling the cylindrical portion 19. The head portion 23 of the handle 22 may have substantially flat side faces, except that the inwardly presented face is provided with a tooth 25 adapted to mesh with the teeth 20, 20 of the toothed member 16. A certain amount of play is permitted between the cone-faced collar 21 and the teeth 20, 20 for a purpose which will be referred to hereinafter. As indicated above, the aperture 24 in the head 23 should be larger than the cylindrical member 19 whereby play of handle 22 relative to cylindrical member 19 is provided.

A mode of operation of the above described embodiment of the present invention is substantially as follows:

When at rest the two handles 22, 22, at either end of said shaft 14 will occupy vertical positions, said handles lying in proximity to the car sides 2, 2, said handles 22, 22 being supported by the shaft 14. Any form of catch, not shown, may be provided for holding the handles 22, 22 in position against the car sides. At this time the handles 22, 22 will lie within the over-all dimensions required for the stakes 3, 3, so that the operating mechanism presents no obtruding parts. When it is desired to operate the shaft 14, the handle 22 will be moved to the angular position illustrated in dotted lines in Figure 2, (that is, will be moved in a plane including said handle 22 and shaft 14) and the tooth 25 of said handle will be enmeshed between two teeth 20, 20, of the toothed members 16. With the handle in this position relative to the toothed member 16, a rocking movement about the shaft 14 as an axis will result in rotation of the shaft 14. By this means a ratchet movement may be applied to the shaft 14, the position of the tooth 25 of handle 22 being changed after each ratcheting stroke; or, if preferred, the tooth 25 may be maintained between the same two teeth 20, 20, and the handle 22 given a continuous movement of rotation about the shaft 14 as an axis to operate the link mechanism 10 and the doors 8, 8. The cone-faced collar 21 acts as an abutment whereby a strong force may be applied to the handle 22 without danger of the tooth 25 of said handle slipping from its position between teeth 20, 20, of the toothed member 16. By reason of the fact that the handle 22, while in operation, is disposed at an angle to the car side during the operating movement, the stakes 3, 3 on the corresponding side of the car may be avoided so that the operator has no difficulty in applying a rotative movement to said handle 22.

A further advantage is had by reason of the fact that the shaft 14 may be operated from either side of the car without requiring the operator to operate any mechanism at the other end of the shaft. This advantage accrues from the fact that though the two operating handles 22, 22 at the two ends of the shaft 14 are, at all times, mounted upon said shaft (i. e. upon the members 16, 16 which are non-rotatably mounted on said shaft 14), each of said handles normally lies so that its tooth 25 is out of engagement with teeth 20, 20. Therefore neither of said handles interferes with the operation of shaft 14 when said shaft is being operated by the handle at the opposite end of said shaft.

Though a preferred embodiment of the present invention has been described in detail, it will be clear that many modifications will be made without departing from the invention. It is intended in this patent to cover all such modifications that fall within the scope of the invention as defined by the appended claims.

What is claimed is:

1. In combination, a dump car, an operating shaft and an operating mechanism for said shaft located at an end thereof, said operating mechanism comprising a toothed member rigidly mounted upon said shaft and a toothed handle adapted to cooperate with said toothed member, said toothed handle being loosely supported by said shaft to permit movement of said handle in a direction axially of said shaft and transversely of said shaft, said toothed handle having a portion encircling the axis of said shaft.

2. In combination, an operating shaft and means for imparting rotative movement to said shaft, said means comprising a toothed member non-rotatably secured to said shaft, a conical abutment member on said shaft placed symmetrically with the axis of rotation of said shaft, and an operating handle, said operating handle having a portion encircling the axis of rotation of said shaft and supported by said shaft between said toothed member and said conical member, said handle having play axially of said shaft and in a plane transversely of said shaft.

3. In combination, a rotatable shaft and means for communicating a movement of rotation to said shaft, said means comprising a tooth means non-rotatably secured to said shaft, an abutment means having a conical face symmetrical with the axis of rotation of said shaft and spaced from said tooth means, and a handle having a head portion lying between said tooth means and said abutment means, said head portion being provided with an aperture encircling the axis of said shaft and permitting play of said handle in a plane including said handle and said shaft.

4. A dump car construction including a door operating shaft, said door operating shaft being provided at an end thereof with a cylindrical member, longitudinally projecting tooth means on said cylindrical member, and an abutment member supported by said cylindrical member, said abutment member having a conical face presented toward said teeth and an operating handle having a head encircling said cylindrical member, said head being provided with a tooth adapted to mesh with said tooth means.

5. A dump car construction including a door operating shaft, said door operating shaft being provided at an end thereof with a cylindrical member, longitudinally projecting tooth means on said cylindrical member, and an abutment member supported by said cylindrical member, said abutment member having a conical face presented toward said teeth and an operating handle having a head loosely encircling said cylindrical member, said head being provided with a tooth adapted to mesh with said tooth means.

6. In combination, a dump car having side walls, reinforcing stakes for said side walls, a transversely extending door operating shaft, and a cylindrical member mounted upon an end of said shaft, said cylindrical member being provided with tooth means and with an abutment member symmetrical with the axis of said shaft, said abutment member having a conical face presented to said tooth means and a handle having a portion encircling said cylindrical member but having play relative to said tooth means and said conical face in a plane including said handle and said shaft.

7. In combination, a dump car having an operating shaft having a cylindrical member at its outer end, said cylindrical member being provided with tooth means and a handle having a portion encircling said cylindrical member and having play relative to said cylindrical member, said portion having a tooth for engagement with said tooth means.

8. In combination in a dump car, a transversely extending operating shaft and operating means for said shaft located at each end thereof, each of said operating means comprising a toothed member rigidly mounted upon said shaft and a toothed handle adapted to cooperate with its corresponding toothed member, said toothed handle being swingingly mounted upon said shaft to have a swinging movement in the plane of said shaft and being disengageable from said toothed member whereby said shaft may be rotated independently of either of said handles.

9. In combination in a dump car, a transversely extending operating shaft and operating means for said shaft located at each end thereof, each of said operating means including a handle mounted upon said shaft but swingingly mounted in the plane of said shaft into and out of operative engagement with said shaft, whereby said shaft may be operated independently of either handle.

10. In combination in a dump car, a transversely extending operating shaft and operating means for said shaft located at each end thereof, each of said operating means including a handle mounted upon said shaft but disengageable therefrom whereby said shaft may be operated independently of either handle, one of said operating means comprising a toothed member rigidly mounted upon said shaft, the handle comprising part of said last mentioned means being toothed and adapted to cooperate with said toothed member, each of said operating means comprising a toothed member rigidly mounted upon said shaft, each of said handles having a tooth rigid therewith and adapted to cooperate with said toothed member.

11. In combination in a dump car, a transversely extending operating shaft and operating means for said shaft located at each end thereof, each of said operating means comprising a toothed member rigidly mounted upon said shaft and a handle having a tooth rigid therewith mounted upon said shaft adapted to cooperate with said toothed member but disengageable from said toothed member.

Signed at Chicago, Illinois, this 26th day of October, 1923.

DAVID HINDAHL.